United States Patent
De Jonge et al.

(10) Patent No.: US 6,944,564 B2
(45) Date of Patent: Sep. 13, 2005

(54) METHOD FOR THE AUTOMATIC CALIBRATION-ONLY, OR CALIBRATION AND QUALIFICATION SIMULTANEOUSLY OF A NON-CONTACT PROBE

(75) Inventors: Lieven De Jonge, Overijse (BE); Bart Van Coppenolle, Linden (BE); Denis Vanderstraeten, Louvain-la-Neuve (BE)

(73) Assignee: Metris N.V., Leuven (BE)

(*) Notice: Subject to any disclaimer, the term of this patent is extended or adjusted under 35 U.S.C. 154(b) by 0 days.

(21) Appl. No.: 10/435,528

(22) Filed: May 8, 2003

(65) Prior Publication Data

US 2004/0021876 A1 Feb. 5, 2004

Related U.S. Application Data (60) Provisional application No. 60/379,592, filed on May 8, 2002.

(30) Foreign Application Priority Data

May 8, 2002 (EP) ............................................. 02447085

(51) Int. Cl.$^7$ .............................................. G01B 11/24
(52) U.S. Cl. ........................... 702/104; 702/91; 702/94; 702/152; 702/167; 356/601
(58) Field of Search ............................... 702/104, 105, 702/91, 94, 95, 150, 152, 167; 600/300, 428; 356/153, 601

(56) References Cited

U.S. PATENT DOCUMENTS

| | | | |
|---|---|---|---|
| 6,493,956 B1 * | 12/2002 | Matsuda | 33/502 |
| 6,583,869 B1 * | 6/2003 | Sheridan | 356/153 |
| 2004/0024311 A1 * | 2/2004 | Quaid | 600/428 |
| 2004/0034282 A1 * | 2/2004 | Quaid | 600/300 |

FOREIGN PATENT DOCUMENTS

| | | |
|---|---|---|
| JP | 2000180103 | 6/2000 |
| WO | WO 0039522 A1 | 7/2000 |
| WO | WO 0041141 A1 | 7/2000 |
| WO | WO 0107866 A1 | 2/2001 |

OTHER PUBLICATIONS

European Patent Office Search Report, Application No. EP 03447101, Sep. 16, 2003.

* cited by examiner

*Primary Examiner*—Bryan Bui
*Assistant Examiner*—Hien Vo
(74) *Attorney, Agent, or Firm*—Knobbe Martens Olson & Bear, LLP

(57) ABSTRACT

The present invention relates to a method for calibrating a non-contact probe on a localizer. The present invention further relates to a method for the simultaneous calibration and qualification of a non-contact probe on a localizer. Both methods do not require user intervention, and use a single artifact.

46 Claims, 2 Drawing Sheets

METHOD FOR THE AUTOMATIC CALIBRATION-ONLY, OR CALIBRATION AND QUALIFICATION SIMULTANEOUSLY OF A NON-CONTACT PROBE

CROSS REFERENCE TO RELATED APPLICATION

This application claims priority to U.S. Provisional Patent Application 60/379,592 entitled "METHOD FOR SELF-CALIBRATION OF A NON-CONTACT PROBE" and filed on May 8, 2002. The disclosure of the above-described filed application is hereby incorporated by reference in its entirety.

FIELD OF THE INVENTION

The present invention relates to a method for a non-contact probe calibration on a localizer. The present invention further relates to a method for the calibration and qualification of a non-contact probe on a localizer in a single step procedure, using a single reference object, also referred to as an artifact.

BACKGROUND OF THE INVENTION

Generally a non-contact probe comprises of one or more emitter sources and one or more receivers. An emitter source projects waves, for example light waves, on the object of interest; the receiver(s) comprising for example a camera, capture(s) the returning waves from the object. For instance, if the receiver is a CCD-camera, it will take one or more shots of the object. By moving the object relative to the non-contact probe or vice versa, shots of the complete object can be taken, i.e. the object is being scanned. Each shot represents a one-dimensional (1D), two-dimensional (2D) or three-dimensional (3D) projection of the object depending on the physical form and working principle of the receiver(s). To obtain accurate 3D points on the surface of the object, relative to a fixed coordinate system, from multiple shots the following system parameters are preferably required:

1. the 3D position of the emitter source(s) relative to the receiver(s);
2. the 3D position and orientation of the emitted waves, relative to the receiver(s), coming from the emitter source(s);
3. the characteristics such as focal point of lenses of the receivers used in the non-contact probe;
4. the dimensions and measuring resolution of the receiver(s); and
5. the 3D position and orientation of the non-contact probe or the object relative to a fixed coordinate system, for each receiver capture.

The actual values of the parameters 1 to 4 are calculated during the calibration. Some of the actual values of parameter 5 are calculated during the qualification procedure, others are given values readily obtainable from the object-non-contact probe, set-up. When these parameters are calculated for the given non-contact probe, the conversion, also called compensation, from receiver readings to accurate 3D points can be performed.

To be able to move the non-contact probe relative to the object, the probe is mounted on a localizer. This localizer can be a structure, portable or non-portable, on which the probe is mounted, like for example a tripod. This localizer can also be structure with moving axes, motorized or non-motorized, where the probe is mounted on the end of said axes, dependent to all other axes, like for example a robot, a milling machine or coordinate measuring machine (CMM). These last types of localizer can have the possibility to record the position and/or the rotation of the probe.

Some of the state-of-the-art techniques actually calculate parameters 1 to 5 explicitly using dedicated measurements in a sequential manner. Adjusting these parameters is difficult because of their complex interactions and adjustment can be time consuming.

Other state-of-the-art techniques for calibration and qualification do not calculate these parameters explicitly. In the first step, the receiver readings are first transformed in one, two or three dimensions, depending on whether the receiver itself is capable of measuring one, two or three dimensions. In this calibration step a receiver reading in receiver units is transformed to a point in e.g. SI units. The calibration can take several phenomena into account; for example, correcting the perspective since the object is not always parallel to the receiver or scaling correctly the readings. Finally, it must model correctly systematic reading errors in the receiver(s)—which is a complex operation.

The second step, the qualification, consists of determining the accurate position and orientation of the non-contact probe relative to a fixed coordinate system. The qualification procedure is generally performed by the end-user using special artifacts or other measuring equipment. The qualification procedure often requires an essential manual alignment of the artifact/measuring equipment with the non-contact probe.

Both steps, calibration and qualification, are based on some parameters that are tuned or optimized to obtain the 3D points accurately. All state of the art algorithms determine the values of the parameters for the two steps separately, usually scanning different artifacts with known features, dimensions, etc.

Although, it is easier to obtain few parameters at a time, this technique suffers from major drawbacks.

The various parameters have complex interactions and it is extremely difficult, if not impossible, to predict the effect of an individual parameter. Hence, an error at the very start can propagate and produce faulty results in the determination of the subsequent parameters. Unfortunately, there is as yet no correct method to back-propagate the information. As a result, even with the utmost care, the parameter fitting will be sub-optimal in the sense that the accuracy of the three-dimensional points will not be the best.

Another drawback of the de-coupled procedure is that it requires many high-level user interactions, which is time consuming and unreliable.

As a consequence, these techniques for calibration and qualification cannot be performed at the user's site, nor by the user itself.

To overcome these problems, the present invention provides a novel integrated approach using one single artifact. The present invention provides a novel method that computes all probe parameters in one single step using only one artifact. In this approach, a general function converts directly a receiver reading into a three dimensional point. This function corresponds to a sequence of calibration and qualification and therefore, depends on many parameters similar to the ones used in the classical de-coupled technique.

However, by expressing the conversion with one function, all interactions between the parameters are considered. Also, if the object being measured is known, the influence of a single parameter can directly be measured in terms of accuracy of the resulting 3D point.

The present invention provides a method to scan a known reference object and to use this information to find the values of the parameters that give the most accurate points. A single requirement of this method is the knowledge of the class of the reference object, like sphere or cube, box the actual sizes, aspect ratio, etc and a volume scan of the object. With these data, the entire procedure, calibration, and qualification is performed automatically.

SUMMARY OF CERTAIN INVENTIVE ASPECTS

One embodiment of the invention is a method for the calibration only, or calibration and qualification simultaneously of a point cloud generator, said point cloud generator comprising a non-contact probe and a localizer, comprising determining the transformation of an electrical reading of the receivers in said non-contact probe in point coordinates relative to the said probe and, if calibrating and qualifying simultaneously, also determining the orientation of the said non-contact probe in the measuring volume of the said localizer, either method using a single artifact.

Another embodiment of the invention is a method as described above, whereby said artifact is a physical object susceptible to point cloud generation, whose outer shape and/or part thereof is definable using a mathematical function and/or look-up tables.

Another embodiment of the invention is a method as described above, whereby said artifact is a sphere, cylinder or box.

Another embodiment of the invention is a method as described above, whereby said artifact is a sphere of unknown diameter.

Another embodiment of the invention is a method as described above, whereby said artifact has unknown dimensions prior to the execution of said method.

Another embodiment of the invention is a method as described above, whereby said artifact has unknown position with respect to said localizer prior to the execution of said method.

Another embodiment of the invention is a method as described above, whereby said method is performed without manual intervention.

Another embodiment of the invention is a method as described above, whereby said method is executed at a user's site.

Another embodiment of the invention is a method as described above comprising the steps of:
 a) scanning said artifact using said point cloud generator,
 b) calculating cloud points, P, using parameters relating to calibration and qualification,
 c) calculating the position and optionally the orientation and/or size of said artifact using P calculated in step b) and knowledge of the artifact according to a mathematical function and/or look-up tables which define said artifact,
 d) comparing the values of P, with those calculated for the artifact derived from step c),
 e) adjusting parameters relating to calibration and qualification, and f) repeating steps b) to e) until parameters relating to calibration and qualification are obtained which provides the closest comparison according to step d).

Another embodiment of the invention is a method as described above whereby step b) is based on the generic function [1]

$$P=Q(f(Pr))+m(Pr) \qquad [1]$$

where
 Pr is a reading of a receiver of the non-contact probe,
 P is a cloud point, calculated from Pr, relative to a fixed coordinate system,
 f is a general mapping function, that maps receiver readings to 1D, 2D or 3D point coordinates, relative to a coordinate frame fixed to the non-contact probe, and
 Q is the orientation of the non-contact probe and m(Pr) is the position of said probe for a given value of Pr, both values with respect to a fixed coordinate frame; none or either values considered as known and fixed parameters.

Another embodiment of the invention is a method as described above wherein f is a non-uniform rational B-spline function.

Another embodiment of the invention is a method as described above, wherein steps b) to f) comprise:
 b) calculating points according to function [1], said function re-expressed as:

$$P=F(Pr, S) \qquad [2]$$

wherein Pr is a reading of a receiver of the non-contact probe,
 P is a point, calculated from Pr, relative to a fixed coordinate system,
 F is a compensation function based on f, Q and m(Pr), said compensation function being applied to Pr using parameter set S,
 c) calculating the position and optionally the orientation and/or size of said artifact using values of P obtained in step b),
 d) comparing the values of P, with those calculated for the artifact derived from step c),
 e) adjusting S, and
 f) repeating steps b) to e) until value of S is obtained which provides the closest comparison according to step d).

Another embodiment of the invention is a method as described above wherein the values calculated for the artifact as mentioned in step d) are derived from a mathematical function and/or look-up tables which define said artifact, the values corresponding to the position, and if calculated orientation and/or size as obtained in step c).

Another embodiment of the invention is a method as described above wherein step c) comprises:
 g) comparing the points P obtained in step b) to those expected of said artifact according to a mathematical function and/or look-up tables which define said artifact,
 h) adjusting one or more of the values corresponding to the position and optionally the orientation and/or size of said artifact, and
 i) repeating steps g) and h) until values corresponding to the position, and if calculated orientation and/or size are obtained which provide the closest comparison according to step g).

Another embodiment of the invention is a method as described above, wherein the comparison performed in step d) comprises one or more average square distance, variance, volume, area, and/or axis of inertia calculations.

Another embodiment of the invention is a method as described above, wherein the comparison performed in step d) comprises one or more average square distance, variance, volume, area and/or axis of inertia calculations.

Another embodiment of the invention is a method for the simultaneous calibration and qualification of a point cloud generator, said point cloud generator comprising a two-dimensional line laser scanner mounted on a 2D co-ordinate measuring machine, comprising:

a) scanning a sphere using said point cloud generator,
b) calculating points according to function [2]

$$P=F(Pr, S) \qquad [2]$$

wherein Pr is a reading of a receiver of the two-dimensional line laser scanner, P is a point, calculated from Pr, relative to a fixed coordinate system, F is a compensation function based on f, Q and m or m(Pr), said compensation function being applied to Pr using parameter set S, Q is the orientation of the non-contact probe; m(Pr) is the position of said probe for a given value of Pr, both values with respect to a fixed coordinate frame and none, either or both values considered as known parameters, c) comparing the points P obtained in step k) to those expected of said sphere according to a mathematical function defining said sphere, d) adjusting one or more of the values corresponding to the position and size of said sphere, e) repeating steps c) and d) until values corresponding to the position and size are obtained which provide the closest comparison according to step c), f) comparing the values of P, with those calculated for the sphere, the latter obtained from mathematical function which defines said sphere, and the values corresponding to its position and size as obtained in step e).

g) adjusting S, h) repeating steps b) to e) until value of S is obtained which provides the closest comparison according to step f).

Another embodiment of the invention is a method to allow an unskilled operator to perform a calibration only, or calibration and qualification simultaneously of a point cloud generator, using a method as described above.

Another embodiment of the invention is a method for performing a calibration only, or calibration and qualification simultaneously of a point cloud generator within 5 minutes of generating the cloud point, using a method as described above.

Another embodiment of the invention is a method for performing a calibration only, or calibration and qualification simultaneously of a point cloud generator without manual intervention, using a method as described above.

Another embodiment of the invention is a use of a single artifact for performing the calibration only, or calibration and qualification simultaneously a point cloud generator according to the method as described above.

Another embodiment of the invention is a computer program wherein a method as described above is performed.

Another embodiment of the invention is a computer having a computer readable medium adapted and programmed to carry out the computer program as described above.

Another embodiment of the invention is a non-contact probe usable according to the method as described above.

Another embodiment of the invention is a non-contact device comprising an artifact and a non-contact probe as described above mounted on a localizer.

DETAILED DESCRIPTION OF CERTAIN INVENTIVE EMBODIMENTS

A "non-contact probe" can be defined as any device mounted on a localizer that through non-contact sensing conducts 1D (distance), 2D or 3D coordinate measurements.

A "localizer" can be defined as any system positioning and orientating a non-contact probe in space, that returns the position and/or the orientation of the non-contact probe in 1D-, 2D- or 3D coordinates.

A "receiver", can be an electronic device in the non-contact probe that captures the waves coming from the object to be measured, resulting in one or multiple electrical readings. Most of the time these electrical readings are voltage readings on pixels of a CCD-camera.

An "artifact" can be any physical object susceptible to point cloud generation, whose outer shape and/or part thereof is definable using a mathematical function and/or look-up tables. Said artifact may be, for example, a sphere, cylinder, cube or box, two spheres joined together, a dumb-bell, a sphere joined to a cube etc. Said artifact may also be any irregular shape such as a mobile phone, a pen, a calculator etc. The method of obtaining a mathematical function and/or look-up table thereof is known to the skilled artisan. Depending on the geometry of the object, its dimensions may be known with accuracy; alternatively the dimension may not be accuracy known, or not known at all.

A "look-up table" can be a data list that defines the shape and dimensions of the object.

A non-contact probe generally comprises of one or more emitter source(s), sending (e.g. light) waves to the object of interest, and one or more receivers, which capture the part of the object that is "hit" by the emitter source. The conversion of the electrical readings of the receiver to an accurate 3D point requires the steps of calibration and qualification executed on beforehand.

Figure 1:
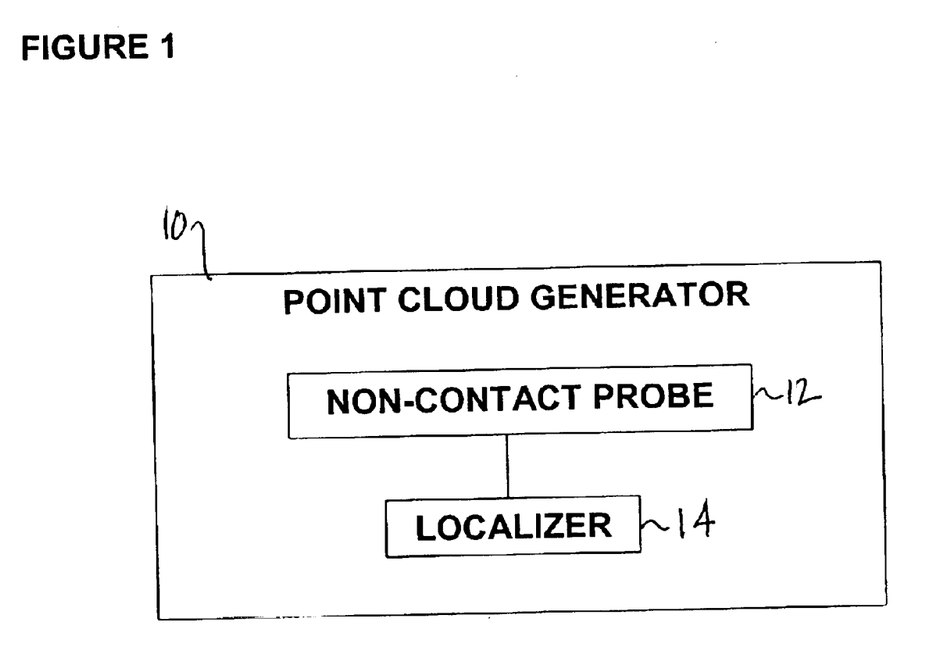
FIG. 1 is a block diagram of a point cloud generator.
Figure 2:
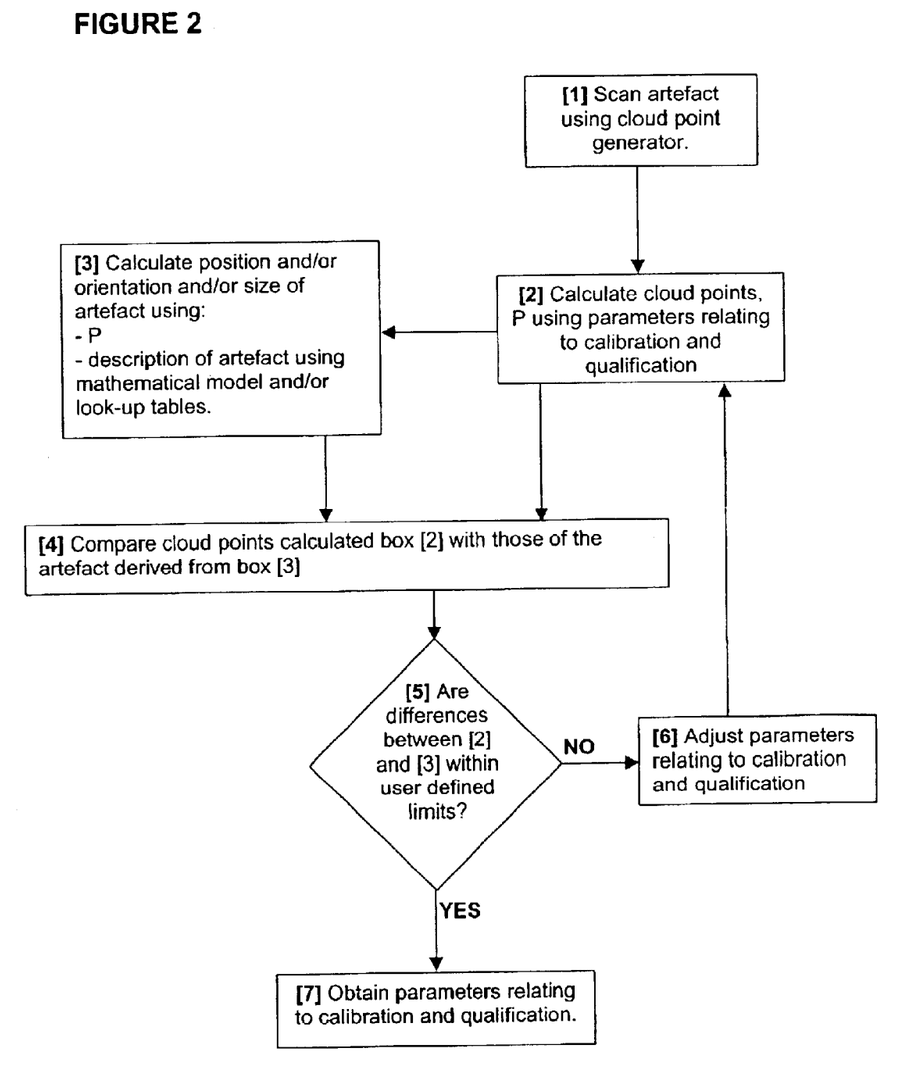
FIG. 2 is a flowchart illustrating one embodiment of a method of calibration only, or calibration and qualification simultaneously of a point cloud generator.

A "point cloud generator" 10 can be a system that comprises two components, namely a non-contact probe 12 and a localizer 14, as illustrated in FIG. 1, whereby both components can be used for 1D, 2D or 3D position and/or orientation measurements.

"Calibration" can be the procedure to identify the conversion between the electrical reading of the receiver in the non-contact probe and 1D, 2D or 3D point coordinates in SI units. In other words, calibration is the procedure to transform an electrical reading in accurate point coordinates. These point coordinates are calculated relative to a coordinate system connected to the non-contact probe.

"Qualification" can be defined as a procedure of completely and accurately identifying the position and orientation of the non-contact probe in the measuring volume of the localizer, possibly using information readily made available by the localizer itself. This procedure is to be performed each time the non-contact probe is mounted on the localizer or each time its position or orientation with respect to the localizer is changed. Thus, qualification is the procedure whereby the position and the orientation of the coordinate system associated with the non-contact probe is defined with respect to a fixed coordinate system.

Finally, "compensation" can be defined as a procedure of making the conversion between the electrical reading of a receiver in the non-contact probe and 1D, 2D or 3D point coordinates using the calculated parameters of the calibration and qualification.

The calibration and qualification steps depend on a variety of parameters, which up to now were determined individually using different artifacts. An "artifact" is used as synonym for a "reference object" and is defined as above.

The present invention relates to a calibration method that determines all the parameters of a non-contact probe mounted on a localizer using only one artifact and the localizer.

One aspect the present invention allows the entire calibration and qualification procedure to be carried out in one single step using only one artifact. Hence the calibration and qualification procedure can be automated with little input from the end-user. In addition, this single step operation provides a more accurate determination of the parameters, which results in a more accurate activity of the non-contact probe.

In one embodiment, the present invention relates to a method for the calibration of a non-contact probe mounted on a localizer whereby the localizer is used to calibrate the probe. Thus, the present invention relates to a method for the calibration of a point cloud generator, said point cloud generator consisting of a non-contact probe and a localizer, comprising determining the transformation of an electrical reading of the receivers in said non-contact probe in point coordinates relative to said probe using said localizer.

State-of-the-art techniques presently perform the calibration of the non-contact probe, dismounted from the localizer, on a separate, dedicated device, mostly in well-defined metrology room conditions.

In contrast, the method according to the invention is performed automatically, without manual intervention, and preferably said method is executed at a user's site.

In a further embodiment, the present invention relates to a calibration method according to the invention whereby the said method is executed on a single artifact. Said artifact is as defined above.

Furthermore, the present invention relates to a method for the calibration and qualification of a non-contact probe whereby both steps are performed simultaneously. Therefore, in another embodiment, the present invention relates to a method for the calibration and qualification of a non-contact probe comprising determining the transformation of an electrical reading of the receivers in said non-contact probe in point coordinates relative to the said probe and identifying the position and orientation of the said non-contact probe in the measuring volume of the said localizer, thereby determining calibration and qualification parameters simultaneously.

The former technologies of non-contact probes perform the calibration and the qualification in two different steps. The present invention consists of a one step procedure for calibration and qualification. By using the same measurements of the non-contact probe mounted on the localizer on only a simple artifact, the non-contact probe is calibrated and qualified. This novel method is characterized by some major improvements compared to the state-of-the-art technologies. The same measurement procedure can be followed for calibration and qualification. Furthermore, calibration and qualification are performed in a single step. The calibration can be conducted by the end-user, where previously the calibration procedure was performed in the factory during production of the non-contact probe or at the end-users location by the service-engineers of the manufacturer. Therefore, the present method represents not only an easier but also a more time-effective method.

In a further embodiment, the present invention relates to a method for the calibration and qualification of a non-contact probe whereby calculation of the calibration and qualification parameters is performed on the same artifact. In a one embodiment, said artifact consists of one or more spheres, cylinders, cubes or boxes, any regular or irregular physical object. According to the present invention the entire calibration-qualification procedure can thus be totally automated; in other words there is a little or no manual interference and said procedure does not rely upon the skill of the operator. Furthermore, calibration and qualification can be performed at the user's site.

As mentioned, the calibration and qualification steps of a non-contact probe depend on a variety of parameters. In another embodiment, the present invention relates to a method for determining the parameters of a non-contact probe in a single step using a single artifact.

The present invention is based on a general mapping function that directly converts a receiver reading into a 3D point. This function depends on various parameters that need to be numerically determined. In the following description, the general mapping function according to the invention is described with use of the conventional division in calibration and qualification. However, it is the aim of the invention to provide an approach that mixes these two steps in one single function. According to the invention, a single measurement procedure to establish the parameters has a greater accuracy than establishing the set of parameters in separated methods.

1. Calibration

The calibration step consists essentially of a mapping from the receiver readings to a 1D, 2D or 3D point relative to a coordinate system connected with the non-contact probe. The dimensions of the point are equal to the dimensions of the receiver. For example a camera with a square CCD-array will produce two-dimensional points after calibration. The goal of the calibration is to express the one-, two- or three-dimensional coordinates of a point in terms of its receiver readings.

The "mapping" provides a description of this correspondence. It consists of a function that maps a reading from the receiver domain of all readings to a 1D, 2D or 3D point. Ideally, the mapping function should be able to model various physical effects of the non-contact probe such as the perspective, imperfectness of working principle or heterogeneous reading resolution and sensitivity.

Several methods have already been proposed in the literature that define generic or specialized mapping functions. The simplest method consists of defining one single function that covers the entire mapping area. The form of this function is critical and prior knowledge of the problem is necessary to make an educated choice. The second class of mapping methods is generic; it is able to effectively model any mapping function provided that the number of parameters is sufficiently high. These methods work by a divide-and-conquer approach, dividing the mapping area in smaller area and defining simple shape functions for the local mapping. The local mapping is then aggregated into a global mapping.

In the present invention any general mapping function can be used, as long as the function offers enough detail to model an accurate conversion from reading to point. For the sake of generality, all points here are considered to be three dimensional. One or two dimensional point can be represented by a three dimensional point without any loss of information. The general representation is given below where $P_r$ (resp. $P_{3D}{}^c$) represents the receiver reading (resp. 3D point), $f$ is the general mapping function $$P_{3D}{}^c = f(P_r), \quad (1)$$

With $f$ defined as $$f: D \to \Re^3 \quad (2)$$

and $\Re$, the three dimensional space and D, the domain of the all possible readings of all receivers:

$$D = \cup_{\forall i} D_i \quad (3)$$

$$D_i \cap D_j = \emptyset \text{ for } i \neq j \quad (4)$$

$D_i$, the domain of all possible readings of the $i^{th}$ receiver and this for all receivers.

A crucial question concerns the amount of data needed to compute the actual parameters of the mapping function. Unfortunately, there is no definite answer to this question. It depends on the accuracy needed and on the scale of the phenomenon studied.

2. Qualification

Qualification consists of a three-dimensional mapping. The calibration maps the reading onto a point located in the physical space, relative to a coordinate system fixed to the non-contact probe. The exact position of this non-contact probe and the determination of its orientation are the tasks of the qualification. The position and the orientation will be determined relative to a coordinate system fixed to the object to be scanned.

The non-contact probe coordinate system is described by 6 parameters, three translation components and three rotation components. The system can be decoupled into the translation component m of the non-contact probe and in the rotation matrix Q. A three-dimensional point $P_{3D}{}^q$ relative to the fixed coordinate system is written as $$P_{3D}{}^q = Q P_{3D}{}^c + m, \quad (5)$$

with $P_{3D}{}^c$ a three-dimensional point relative to the non-contact probe coordinate system.

In instances where the value of m depends on Pr, the equation may be rewrittten as Equation 5.1, which also cover instances when m is independent of Pr.

$$P_{3D}{}^q = Q P_{3D}{}^c + m(Pr), \quad (5.1)$$

Where m(Pr) is the value of m when m depends on Pr.

In general as the localizer moves the non-contact probe and/or the object in space the relative position and orientation of the probe to the object changes. In other words the rotation matrix Q and translation component m both change during movement. Dependent on the type of localizer, a CMM or robot, some of the components of Q and m are constant and/or known during the movement of the probe and the object. The use of these types of localizers is within the scope of the invention. For example, a CMM might produce the position of the probe and the object during movement with a good accuracy. In this case the component m is considered to be known and does not need to be identified during the qualification.

As described above, the necessary steps to convert individual readings of the receivers into actual three-dimensional coordinates, with (if available) the knowledge of the position and orientation of the probe given by the localizer at discrete time steps, were de-coupled. By aggregating these various steps, we can thus express directly a 3D point $P_{3D}{}^q$ (also known as P herein) in terms of a receiver reading $P_r$ by $$P_{3D}{}^q = Q(f(P_r)) + m, \quad (6)$$

or $$P_{3D}{}^q = Q(f(P_r)) + m(P_r), \quad (6.1)$$

where $f$ is the calibration function, Q, m and m(Pr) are the position and orientation of the probe stemming from the qualification. These functions and these symbols have been defined in eqs (1) to (5.1).

Equations (6) and (6.1) contain the following parameters to be defined in the calibration-qualification procedure:

the function $f$ is a general mapping function with enough parameters to accurately model the transformation from receiver reading to 3D point in the probe space. Such functions are known in the art. If for example a polynomial function is chosen as mapping function, then the parameters are the coefficients. The degree and the type of polynomial are not parameters but constants.

Depending on the accurate information obtained from the localizer, either three translation components (the position m), or three rotations (the orientation Q), or both are considered as parameters. For example if the localizer is a CMM with accurate information on the position of the probe in the localizer space and the probe performs only parallel movements, the three rotations (the orientation Q) are the only parameters.

All these parameters can be grouped in a parameter set S and the equation (6) can be rewritten as:

$$P_{3D}{}^q = F(P_r, S) \quad (7)$$

With F the compensation function based on a calibration—qualification procedure with parameter set S:

$$F: D \to \Re^3 \quad (8)$$

And D defined as in eqs. (3) and (4).

In another embodiment, the present invention relates to a method of determining calibration and qualification parameters, which is based on a generic function, said generic function being a non-uniform rational B-spline function. The present invention relates to a new general procedure or method for determining all these parameters in a single step. In an embodiment the present invention relates to a method of determining a parameter configuration comprising the steps of:

scanning an single artifact; and applying a computational procedure to adjust all said parameters directly and simultaneously using the scanning data.

Said parameter configuration comprises the parameters mentioned above which are required to establish a generic model in which the steps of calibration and qualification are integrated.

In one embodiment of the invention, the artifact used for calibration, qualification and position interpolation of the non-contact probe is identical to the artifact used for the qualification of probe which is a tactile or contact probe and said artifact is a sphere.

The method of the invention for simultaneous determination of calibration and qualification using a single artifact has several key features. Importantly, only one single artifact is used. Also, the exact size, position, or orientation of this artifact is not initially known. Furthermore, all parameters are evaluated concurrently. In addition, the method performs only one scan of the reference object or artifact and very little user interaction is required. Using this method the adjusted parameters are obtained, which can be used in the above-described generic function.

In a preferred embodiment, the present invention relates to a method of determining calibration and qualification parameters comprising the steps of
  scanning a single artifact;
  determining the optimal position, and optionally, the orientation and/or size of said artifact using the scanning data;
  evaluating the quality of said parameter configuration via a multidimensional optimization procedure; and
  determining the best configuration of the parameters.

An example of the procedure is described in more detail as follows: An initial parameter configuration S in equation (7) is chosen. This configuration is used to establish the generic model described above. Subsequently, an artifact is scanned. The data obtained by a scan of this reference object is a series of receiver readings optionally together with the positions and/or orientations of the probe relative to the artifact. When applying the generic model, which was established using the configuration S, to this series of receiver readings a cloud of 3D points is obtained. As neither the exact position, orientation nor size of the reference object are known, using the cloud of 3D points the optimal position and optionally the orientation and/or size of the artifact that matches the 3D points is first determined. Note that calculating the optimal orientation or size of an artifact is optional, depending on the geometry of the object, and whether any dimensions are already known; when a sphere is used, for example, the orientation does not need to be determined, as described below; when the artifact is an object of known dimensions, only the position and orientation of the object need to be determined. Once the position, orientation and size of the artifact have been determined, the cloud of 3D points can be "compared" with the scanned artifact, and then the quality of the parameter configuration (S) is evaluated. Finally, since a cost or a quality can be assigned to each configuration S, a standard multidimensional optimization procedure can be applied to determine the best configuration $S_{best}$.

In the following description, the standard multidimensional optimization procedure is explained in further detail. Designing a proper cost function is crucial in any optimization procedure and it has been the subject of many publications in the prior art. A "good" cost function should represent accurately the model being investigated without being too complex as to prevent any optimization. In other words, a minimum of the cost function should represent an optimal configuration of the parameters while plateau's in the cost function should be avoided to ensure convergence of the iterative algorithm. From a computational point of view, the cost function should also be easy to compute as it needs to be evaluated many times.

A multidimensional optimization procedure of the present invention is disclosed in the following description. In one aspect of the invention, an algorithm starts from an initial configuration $S_{ini}$ and defines it as the current configuration $S_{cur}$. Then, in a loop, the configuration is iteratively adapted, yielding each time a new $S_{cur}$, in an attempt to better match the cloud of 3D points with the artifact shape. The algorithms stops when the accuracy can no longer be improved, i.e. when the cost function is at its minimum.

In a method of the present invention, the evaluation of the cost function consists of two phases. The first phase consists of determining the best position, and optionally size and/or orientation of an artifact using the 3D points obtained with the active configuration $S_{cur}$. Depending of the shape of the artifact a direct computation or an iterative computation is performed.

In the second phase, the distance between the individual 3D points and the artifact are computed and aggregated, using, for example, one or more average square distance, variance, volume, area computation, axis of inertia calculations, or other method known in the art, to give the actual cost of the parameter configuration. In the ideal situation, when all distances are zero, i.e. all points lie perfectly on the artifact, the cost function is zero and the active configuration is optimal. An example of an algorithm is given below:

1. Choose an initial configuration $S_{ini}$
2. Set initial configuration as current configuration $S_{cur}=S_{ini}$
3. Set $S_{best}=S_{cur}$ and the cost $C(S_{best})=$
4. While $C(S_{best})$ is not within the desired accuracy (as set by the user), do the following:
5. Compute the cloud of 3D points from eq. (7), using the receiver readings and $S_{cur}$
6. Evaluate the best position, and optionally, orientation and/or size of the artifact for the computed 3D points
7. Compare the virtual artifact with the 3D points to compute the cost $C(S_{cur})$
8. If $C(S_{cur})<C(S_{best})$, $S_{best}=S_{cur}$.
9. Choose a new $S_{cur}$ At the end of the computation, the parameters of $S_{best}$ are those that give the best representation of the artifact.

Step 6 determines the best position and optionally, the orientation and/or size of the artifact, by comparing a cloud of 3D points generated in step 5 with the artifact. In one aspect of the invention, if the artifact is an object of unknown position, dimension(s) and orientation, but its shape is mathematically defined, the best-fit position, dimension(s) and orientation may be derived by iterative fitting the unknown position, dimensions and orientation using the mathematical description of the shape to the cloud of 3-D points. In another aspect of the invention, if the artifact is an irregular object of accurately known dimensions, its position and orientation may be determined by iteratively fitting the best position and orientation of the object dimensions to the cloud of 3D points. The dimensions may be read, for example, from a look-up table. The method can determine the best position, orientation and size of the artifact, for any combination of available object parameters. The iterative fittings of the artifact to the cloud points may be performed by a shaping-matching model comprising any known methods of the art. Possible shapes of the artifact include cylinders, cubes, boxes, spheres, any irregular or regular shape.

For the purpose of illustration, general shape matching with a sphere will be described, although the procedure is non-limiting for the present invention. A sphere can be described by 3 parameters for its center c: $(c_x, c_y, c_z)$, and one parameter for its radius r. For every point p, with parameters $(p_x, p_y, p_z)$, it is then easy to compute its distance d to the sphere as $$d=\|p-c\|_2-r=((p_x-c_x)^2+(p_y-c_y)^2+(p_z-c_z)^2)^{1/2}-r \qquad (9)$$

or a pseudo distance $$d' = \|p-c\|_2^2 - r^2 = (p_x-c_x)^2 + (p_y-c_y)^2 + (p_z-c_z)^2 - r^2 \qquad (10)$$

For a given set of parameters (c, r), it is then possible to define a cost function:

$$C_{art}(c,r) = \Ō d^2, \qquad (11)$$

or $$C_{art}(c,r) = \Ō d'^2, \qquad (12)$$

where the sum goes over all points of the receiver(s).

Standard derivation techniques can be used to determine the values of c and r that minimize $C_{art}$. When the cost function $C_{art}$ is non linear, a regular multidimensional optimization procedure can be used to determine the best values of c and r.

The results of step 6 is a virtual artifact whose best position, size and orientation have been calculated (or were partly already known). In step 7, the cloud of 3D points generated in step 5 is compared to said virtual artifact, and a cost of fitting is generated for a set of S parameters. The method used to generate the cost (the cost function, C) can be any known in the art, as already mentioned above. The value of S is adjusted until the cost of fitting is minimized. The minimization procedure can be any known in the art.

Thus, the two cost functions C and $C_{art}$ used in the calibration-qualification procedure are described above. The general cost function C is used to find the parameter configuration for the calibration and qualification while the second function $C_{art}$ is used inside the first to find the best shape.

According to the above example, only the shape of the sphere is needed and not its actual size. As a consequence, the radius r of the sphere is required to be determined by the shape-matching model $C_{art}$. Of course if, for other shapes, additional information is available, such as a size, an aspect ratio, dimensions etc, they can be easily used to reduce the number of parameters required to be determined by the shape-matching model. In the example provided above in which the artifact is a sphere, were the radius to be already known, the problem would be reduced to the determination of the optimal sphere center c—and so there would only be three parameters to determine.

When robust optimization algorithms are used, the initial configuration is of little importance. However, when the cost function contains many local minima, providing an initial configuration close to the optimal, but unknown, configuration is desirable. With the model according to the present invention, it is also possible to automate this step. Indeed, the model according to the present invention contains two loosely connected entities, namely, the calibration and the qualification. In order to the find an initial good configuration, one of both entities is fixed and the other one is solved.

More precisely, when qualification is not required and hence neglected in the calculation, only the calibration is investigated. When only a calibration is performed, values of Q and m according to equation 6.1 should be known and are fixed in the calculation.

With a fixed calibration, the optimization of, at most, 6 parameters of the qualification can be performed in a straightforward manner using a method of the present invention. When only a qualification is performed, the value of F should be known and fixed in the calculation.

When calibration and qualification calculations are performed separately as described in the preceding paragraphs, the values obtained by one calculation be used as the fixed, known parameter in the other calculation. For example, a qualification-only optimization will produce values of Q and m; the values of Q and m so calculated can be used as the fixed values in the calibration-only optimization. Performing several iterations of separate calibration and qualification calculations wherein the parameters obtained from one calculation are used in the other calculation, results in an initial configuration parameter set that is close to the optimal configuration achieved by performing calibration and qualification simultaneously.

The method presented herein allows an unskilled operator to perform a simultaneous calibration and qualification of a point cloud generator. The quality of said calibration and qualification are independent of the skill of the operator, in contrast to the present methods of the art, which are technically demanding and require a high level of skill and experience.

The method presented herein allows a simultaneous calibration and qualification of a point cloud generator within 5 minutes of the generation of the cloud point. The method presented herein allows a simultaneous calibration and qualification of a point cloud generator within 10, 15, 20, 25, 30, 35, 40, 45, 50, 55, 60, 70, 80, 90, 100, 120, 140, 160, 180, 200, 250, 300, 350, 400, 450, or 500 minutes of the generation of the cloud point. The speed of the method is achieved because no manual interventions are required; the method is automatic.

The method presented herein allows a simultaneous calibration and qualification of a point cloud generator without manual intervention, once the first scan has been instructed. in contrast to the present methods of the art, which requires extensive manual interventions and skill to adjust components of the point cloud generator.

In one embodiment of the invention, the following minimization algorithm is used, wherein Pr is the array of receiver data (size n), M is the corresponding machine positions (size n), N is the array of control points of the NURBS (size nc), and Q is the qualification matrix (size 6).

```
void CalibrateAndQualify(in Pr, in M, out N, out Q)
{
    // Initialization (set to zero)
    N = 0;
    Q = 0;
    C = 1e100;
    for iter = 1 to 10000
    {
        // Perturb the current nurbs
        for i = 1 to nc
            Nnew(i) = N(i) + rand(-1,1);
        // Perturb the current orientation
        for i = 1 to 6
            Qnew(i) = Q(i) + rand(-1,1);
        // Compute the 3D points
        for i = 1 to n
            P3(i) = Eval(Pr(i), Nnew, Qnew, M(i));
        // Fit the points to the artifact
        Cnew = Fit(P3);
        // Update the best calibration/qualification so far
        if .(Cnew < C)
        {
            C = Cnew
            N = Nnew;
            Q = Qnew;
        }
        // Stop if necessary
        if (C < tol)
            return;
```

-continued

```
        }
    }
///////////////////////////////////////////////////
///////////////////////
Point3D Eval(in Pr, in N, in Q, in M)
        // Nurbs evaluation see Piegi&Tiller
        P = N(Pr);
        // Orientation where Q is q 4×4 matrix
        p = Q*p;
        // Machine position
        P = P + M;
        return P;
    }
///////////////////////////////////////////////////
//////////////
double Fit(in P)
{
        // Fit the artifact (here a sphere is taken as
example);
        S = FitSphere(P, radius, center);
        // Compute the cost
        C = 0;
        for i = 1 to n
            C = C + abs((center-P(i))^2-radius^2);
        return C;
}
```

The minimization algorithm uses a Monte-Carlo method where the current calibration and qualifications are randomly perturbed and accepted if the resulting set of points closer to the artifact (see Z. Michalewicz, "Modem Heuristics" for a survey of Monte-Carlo method). The calibration is performed by means of a non-uniform rational B-spline (NURBS) curve or surface depending on the dimension of the receiver. The algorithm uses an order two NURBS with uniform knot vector (see Piegl and Tiller, "The NURBS Book"). The numbers of knots and control points depend on the desired accuracy of the calibration. The qualification is defined as a 4×4 matrix with 6 degrees of freedom.

In another embodiment, the present invention relates to the use of a single artifact for performing the calibration and qualification procedure according to the method of the invention.

In another embodiment, the present invention relates to a computer program stored on a computer readable medium wherein the steps of the method according to the invention are performed. Another embodiment of the invention concerns a computer adapted and programmed to carry out the computer program according to the invention.

Moreover, the present invention also relates to a non-contact probe usable according to the method of the invention. This non-contact probe is consequently capable of performing at least 1 and preferably the 2 steps of calibration and qualification in a single operation. After these steps have been performed the non-contact probe is ready for industrial use by the end-user, until it is dismounted from the localizer or until its position or orientation is changed with respect to the localizer.

The present invention also provides for a non-contact device comprising a non-contact probe according to the invention, which is mounted on a localizer, and an artifact.

What is claimed is:

1. A method of simultaneous calibration and qualification of a point cloud generator, said point cloud generator comprising a non-contact probe and a localizer, the method comprising:
   determining the transformation of an electrical reading of the receivers in said non-contact probe in point coordinates relative to a coordinate system fixed to the said probe; and
   determining the orientation of the said non-contact probe in the measuring volume of the said localizer, wherein the method uses a single artifact.

2. The method according to claim 1, wherein said artifact is a physical object susceptible to point cloud generation, whose outer shape and/or part thereof is definable using a mathematical function and/or look-up tables.

3. The method according to claim 2, wherein said artifact is a sphere, cylinder or box.

4. The method according to claim 2, wherein said artifact is a sphere of unknown diameter.

5. The method according to claim 2, wherein said artifact has unknown dimensions prior to the execution of said method.

6. The method according to claim 2, wherein said artifact has unknown position with respect to said localizer prior to the execution of said method.

7. The method according to claim 1, wherein said method is performed without manual intervention.

8. The method according to claim 1, wherein said method is executed at a user's site.

9. The method of claim 1, further comprising using the same device to both calibrate the point cloud generator and measure a physical object.

10. The method of claim 1, wherein the calibration is performed within a coordinate system fixed to the non-contact probe and without reference to points in known positions.

11. A method of calibration only, or simultaneously calibration and qualification of a point cloud generator, said point cloud generator comprising a non-contact probe and a localizer, the method comprising:
   determining the transformation of an electrical reading of the receivers in said non-contact probe in point coordinates relative to the said probe;
   if simultaneously calibrating and qualifying, also determining the orientation of the said non-contact probe in the measuring volume of the said localizer, either method using a single artifact, wherein said artifact is a physical object susceptible to point cloud generation, whose outer shape and/or part thereof is definable using a mathematical function and/or look-up tables;
   a) scanning said artifact using said point cloud generator;
   b) calculating cloud points, P, using parameters relating to calibration and qualification;
   c) calculating the position and optionally the orientation and/or size of said artifact using P calculated in b) and knowledge of the artifact according to a mathematical function and/or look-up tables which define said artifact;
   d) comparing the values of P, with those calculated for the artifact derived from c);
   e) adjusting parameters relating to calibration and qualification; and
   f) repeating b) to e) until parameters relating to calibration and qualification are obtained which provides the closest comparison according to step d).

12. The method according to claim 11, wherein b) is based on the generic cloud point function $P=Q(f(Pr))+m(Pr)$
   wherein
   Pr is a reading of a receiver of the non-contact probe;
   P is a cloud point, calculated from Pr, relative to a fixed coordinate system;
   f is a general mapping function, that maps receiver readings to 1D, 2D or 3D point coordinates, relative to a coordinate frame fixed to the non-contact probe; and Q is the orientation of the non-contact probe and m(Pr) is the position of said probe for a given value of Pr, both values with respect to a fixed coordinate frame, none or either values considered as known and fixed parameters.

13. The method according to claim 12, wherein f is a non-uniform rational B-spline function.

14. The method according to claim 11, wherein b) to f) comprise:

b) calculating points according to the generic cloud point function, said function re-expressed as:

$$P=F(Pr, S)$$

wherein Pr is a reading of a receiver of the non-contact probe;

P is a point, calculated from Pr, relative to a fixed coordinate system;

F is a compensation function based on f, Q and m(Pr), said compensation function being applied to Pr using parameter set S;

c) calculating the position and optionally the orientation and/or size of said artifact using values of P obtained in b);

d) comparing the values of P, with those calculated for the artifact derived from c);

e) adjusting S; and f) repeating b) to e) until a value of S is obtained which provides the closest comparison according to d).

15. The method according to claim 11 wherein the values calculated for the artifact as mentioned in d) are derived from a mathematical function and/or look-up tables which define said artifact, the values corresponding to the position, and if calculated orientation and/or size as obtained in c).

16. The method according to claim 11 wherein c) comprises:

g) comparing the points P obtained in b) to those expected of said artifact according to a mathematical function and/or look-up tables which define said artifact;

h) adjusting one or more of the values corresponding to the position and optionally the orientation and/or size of said artifact; and i) repeating g) and h) until values corresponding to the position, and if calculated orientation and/or size are obtained which provide the closest comparison according to g).

17. The method according to claim 11, wherein the comparison performed in d) comprises one or more average square distance, variance, volume, area, and/or axis of inertia calculations.

18. The method according to claim 9, wherein the comparison performed in d) comprises one or more average square distance, variance, volume, area and/or axis of inertia calculations.

19. A method of simultaneous calibration and qualification of a point cloud generator, said point cloud generator comprising a two-dimensional line laser scanner mounted on a 3D co-ordinate measuring machine, the method comprising:

a) scanning a sphere using said point cloud generator;

b) calculating points according to the point function $$P=F(Pr, S)$$

wherein Pr is a reading of a receiver of the two-dimensional line laser scanner, P is a point, calculated from Pr, relative to a fixed coordinate system, F is a compensation function based on f, Q and m or m(Pr), said compensation function being applied to Pr using parameter set S, Q is the orientation of the non-contact probe; m(Pr) is the position of said probe for a given value of Pr, both values with respect to a fixed coordinate frame and none, either or both values considered as known parameters;

c) comparing the points P obtained in b) to those expected of said sphere according to a mathematical function defining said sphere;

d) adjusting one or more of the values corresponding to the position and size of said sphere;

e) repeating c) and d) until values corresponding to the position and size are obtained which provide the closest comparison according to step c);

f) comparing the values of P, with those calculated for the sphere, the latter obtained from mathematical function which defines said sphere, and the values corresponding to its position and size as obtained in step e);

g) adjusting S;

h) repeating b) to e) until value of S is obtained which provides the closest comparison according to f).

20. A method to allow an unskilled operator to perform a simultaneous calibration and qualification of a point cloud generator, wherein the point cloud generator comprises a non-contact probe and a localizer, the method comprising:

determining the transformation of an electrical reading of the receivers in said non-contact probe in point coordinates relative to a coordinate system fixed to the said probe; and determining the orientation of the said non-contact probe in the measuring volume of the said localizer, wherein the method uses a single artifact.

21. A method of performing calibration and qualification simultaneously of a point cloud generator within about 5 minutes of generating the cloud point, wherein the point cloud generator comprises a non-contact probe and a localizer, the method comprising:

determining the transformation of an electrical reading of the receivers in said non-contact probe in point coordinates relative to a coordinate system fixed to the said probe; and determining the orientation of the said non-contact probe in the measuring volume of the said localizer, wherein the method uses a single artifact.

22. A method of performing simultaneous calibration and qualification of a point cloud generator without manual intervention, wherein the point cloud generator comprises a non-contact probe and a localizer, the method comprising:

determining the transformation of an electrical reading of the receivers in said non-contact probe in point coordinates relative to a coordinate system fixed to the said probe; and determining the orientation of the said non-contact probe in the measuring volume of the said localizer, wherein the method uses a single artifact.

23. Use of a single artifact for performing simultaneous calibration and qualification of a point cloud generator, wherein the point cloud generator comprises a non-contact probe and a localizer, and wherein the calibration only or calibration and qualification are performed according to the method comprising:

determining the transformation of an electrical reading of the receivers in said non-contact probe in point coordinates relative to a coordinate system fixed to the said probe; and determining the orientation of the said non-contact probe in the measuring volume of the said localizer, wherein the method uses a single artifact.

24. A computer readable medium having a computer program performing a method of simultaneous calibration and qualification of a point cloud generator comprising a non-contact probe and a localizer, wherein the method comprises:

determining the transformation of an electrical reading of the receivers in said non-contact probe in point coordinates relative to a coordinate system fixed to the said probe; and determining the orientation of the said non-contact probe in the measuring volume of the said localizer, wherein the method uses a single artifact.

25. A computer programmed to execute a computer readable medium having a computer program performing a method of simultaneous calibration and qualification of a point cloud generator comprising a non-contact probe and a localizer, the method comprising:

determining the transformation of an electrical reading of the receivers in said non-contact probe in point coordinates relative to a coordinate system fixed to the said probe; and determining the orientation of the said non-contact probe in the measuring volume of the said localizer, wherein the method uses a single artifact.

26. A non-contact probe usable according to a method of simultaneous calibration and qualification of a point cloud generator comprising the non-contact probe and a localizer, the method comprising:

determining the transformation of an electrical reading of the receivers in said non-contact probe in point coordinates relative to a coordinate system fixed to the said probe; and determining the orientation of the said non-contact probe in the measuring volume of the said localizer, wherein the method uses a single artifact.

27. A non-contact device comprising an artifact and a non-contact probe mounted on a localizer, wherein the non-contact probe is usable according to the method comprising:

simultaneous calibrating and qualifying, the non-contact device, wherein calibrating only or calibrating and qualifying comprises:

determining the transformation of an electrical reading of the receivers in said non-contact probe in point coordinates relative to a coordinate system fixed to the said probe; and determining the orientation of the said non-contact probe in the measuring volume of the said localizer, wherein the method uses a single artifact.

28. A method of calibration only of a point cloud generator, said point cloud generator comprising a non-contact probe and a localizer, the method comprising:

determining the transformation of an electrical reading of the receivers in said non-contact probe in point coordinates relative to a coordinate system fixed to the said probe using a single artifact.

29. The method of claim 28, further comprising simultaneously qualifying the non-contact probe with said calibration, wherein the method further comprises determining the orientation of the said non-contact probe in the measuring volume of the said localizer.

30. The method according to claim 28, wherein said artifact is a physical object susceptible to point cloud generation, whose outer shape and/or part thereof is definable using a mathematical function and/or look-up tables.

31. The method according to claim 30, wherein said artifact is a sphere of unknown diameter.

32. The method according to claim 30, wherein said artifact has unknown dimensions prior to performing said method.

33. The method according to claim 30, wherein said artifact has unknown position with respect to said localizer prior to performing said method.

34. The method according to claim 30, wherein said artifact is a sphere, cylinder or box.

35. The method according to claim 28, wherein said method is performed without manual intervention.

36. The method according to claim 28, wherein said method is performed at a user's site.

37. The method of claim 28, further comprising using the same device to both calibrate the point cloud generator and measure a physical object.

38. The method of claim 28, wherein the calibration is performed within a coordinate system fixed to the non-contact probe and without reference to points in known positions.

39. A method to allow an unskilled operator to perform a calibration of a point cloud generator, wherein the point cloud generator comprises a non-contact probe and a localizer, the method comprising:

determining the transformation of an electrical reading of the receivers in said non-contact probe in point coordinates relative to a coordinate system fixed to the said probe, wherein the method uses a single artifact.

40. A method of performing a calibration of a point cloud generator within about five minutes of generating the cloud point, wherein the point cloud generator comprises a non-contact probe and a localizer, the method comprising:

determining the transformation of an electrical reading of the receivers in said non-contact probe in point coordinates relative to a coordinate system fixed to the said probe, wherein the method uses a single artifact.

41. A method of performing a calibration of a point cloud generator without manual intervention, wherein the point cloud generator comprises a non-contact probe and a localizer, the method comprising:

determining the transformation of an electrical reading of the receivers in said non-contact probe in point coordinates relative to a coordinate system fixed to the said probe, wherein the method uses a single artifact.

42. Use of a single artifact for performing the calibration of a point cloud generator, wherein the point cloud generator comprises a non-contact probe and a localizer, and wherein the calibration is performed according to the method comprising:

determining the transformation of an electrical reading of the receivers in said non-contact probe in point coordinates relative to a coordinate system fixed to the said probe, wherein the method uses a single artifact.

43. A computer readable medium having a computer program performing a method of calibration of a point cloud generator comprising a non-contact probe and a localizer, wherein the method comprises:

determining the transformation of an electrical reading of the receivers in said non-contact probe in point coordinates relative to a coordinate system fixed to the said probe, wherein the method uses a single artifact.

44. A computer programmed to execute a computer readable medium having a computer program performing a method of calibration of a point cloud generator comprising a non-contact probe and a localizer, the method comprising:

determining the transformation of an electrical reading of the receivers in said non-contact probe in point coordinates relative to a coordinate system fixed to the said probe, wherein the method uses a single artifact.

45. A non-contact probe usable according to a method of calibration of a point cloud generator comprising the non-contact probe and a localizer, the method comprising:

determining the transformation of an electrical reading of the receivers in said non-contact probe in point coordinates relative to a coordinate system fixed to the said probe, wherein the method uses a single artifact.

46. A non-contact device comprising an artifact and a non-contact probe mounted on a localizer, wherein the non-contact probe is usable according to the method comprising:

calibrating the non-contact device, wherein calibrating comprises:

determining the transformation of an electrical reading of the receivers in said non-contact probe in point coordinates relative to a coordinate system fixed to the said probe, wherein the method uses a single artifact.

* * * * *

UNITED STATES PATENT AND TRADEMARK OFFICE
CERTIFICATE OF CORRECTION

PATENT NO.       : 6,944,564 B2
APPLICATION NO.  : 10/435528
DATED            : September 13, 2005
INVENTOR(S)      : Lieven De Jonge et al.

It is certified that error appears in the above-identified patent and that said Letters Patent is hereby corrected as shown below:

TITLE page, ITEM (75) Inventors, delete "Louvain-la-Neuve" and insert -- Hamme-Mille --, therefor.

Column 1, line 57, delete "probe," and insert -- probe --
Column 1, line 65, after "be" insert -- a --
Column 9, line 11, delete "$\mathfrak{R}$." and insert -- $\mathfrak{R}^3$, --
Column 14, line 1, after "calculation" insert -- may --
Column 15, line 29, before "closer" insert -- is --
Column 15, line 29, delete "Modem" and insert -- Modern --
Column 15, line 66, in Claim 1, delete "and; and" and insert -- ; and --
Column 16, line 28, in Claim 11, delete "simultaneously" and insert -- simultaneous --
Column 17, line 31, in Claim 15, delete "11" and insert -- 11, --
Column 17, line 36, in Claim 16, delete "11" and insert -- 11, --
Column 17, line 52, in Claim 18, delete "claim 9," and insert -- claim 11, --
Column 18, line 27, in Claim 20, after "perform" delete "a"
Column 19, line 48, in Claim 27, delete "simultaneous" and insert -- simultaneously --

Signed and Sealed this

Twenty-sixth Day of December, 2006

JON W. DUDAS
*Director of the United States Patent and Trademark Office*